United States Patent [19]

Nattel

[11] Patent Number: 4,978,092
[45] Date of Patent: Dec. 18, 1990

[54] UNIVERSAL SUPPORT BRACKET FOR ATTACHMENT TO THE BACK OF AN ELECTRICAL BOX

[75] Inventor: William Nattel, Montreal, Canada

[73] Assignee: Commander Electrical Materials, Inc., Ontario, Canada

[21] Appl. No.: 445,293

[22] Filed: Dec. 4, 1989

[30] Foreign Application Priority Data

Jun. 22, 1989 [CA] Canada ..................... 603685

[51] Int. Cl.⁵ ........................................... A47B 96/00
[52] U.S. Cl. .................................. 248/205.1; 220/3.7; 248/300; 248/906; 248/909
[58] Field of Search .................... 248/205.1, 300, 27.1, 248/906; 220/3.7, 3.9, 3.4

[56] References Cited

U.S. PATENT DOCUMENTS

| | | | |
|---|---|---|---|
| 1,718,878 | 6/1929 | Raquette | 248/906 X |
| 1,961,728 | 6/1934 | Arnest et al. | 248/906 X |
| 1,963,951 | 6/1934 | Bowers | 248/906 X |
| 2,374,622 | 4/1945 | Rugg | 248/906 X |
| 2,406,587 | 8/1946 | Cooper | 248/909 X |
| 2,423,757 | 7/1947 | Dedge . | |
| 2,439,091 | 4/1948 | Keating | 248/906 X |
| 2,512,188 | 6/1950 | Wait et al. . | |
| 2,531,840 | 11/1950 | Carlson . | |
| 2,605,012 | 7/1952 | Duncan . | |
| 3,148,698 | 9/1964 | Arnold | 220/3.7 X |
| 3,448,952 | 6/1969 | Swanquist et al. . | |
| 3,565,399 | 2/1971 | Kelly . | |
| 3,588,017 | 6/1971 | O'Brien | 248/205.1 |
| 3,610,561 | 10/1971 | Greenwood . | |
| 3,684,230 | 8/1972 | Swanquist . | |
| 3,767,151 | 10/1973 | Seal et al. . | |
| 4,057,164 | 11/1977 | Maier . | |
| 4,108,414 | 8/1978 | Grant, Sr. . | |
| 4,140,293 | 2/1979 | Hansen | 248/906 X |
| 4,180,226 | 12/1979 | Matte . | |
| 4,183,486 | 1/1980 | Esoldi . | |
| 4,226,393 | 10/1980 | Rardin et al. . | |
| 4,399,922 | 8/1983 | Horsley . | |
| 4,483,501 | 11/1984 | Eddy | 248/205.1 |
| 4,497,416 | 2/1985 | Smolik | 248/906 X |
| 4,645,089 | 2/1987 | Horsley . | |
| 4,688,693 | 8/1987 | Medlin, Jr. . | |
| 4,732,356 | 3/1988 | Medlin, Sr. . | |

FOREIGN PATENT DOCUMENTS 698275 11/1964 Canada .
838323 3/1970 Canada .
1105121 7/1981 Canada .

OTHER PUBLICATIONS

Commander, "SSB-1 Square Box Support Bracket", Section 4, Sheet 433, Dec. 1986.
Commander, illustrated catalog sheet, "Accessories", Oct. 1, 1988.

Primary Examiner—Ramon O. Ramirez
Attorney, Agent, or Firm—G. H. Telfer

[57] ABSTRACT

A universal support market for attachment to the back of an electrical box, supports the box in a hollow wall structure. The support bracket at the back of the box provides a more rigid mounting to support the box when an electrical plug is pushed into or pulled from an outlet. The bracket comprises an elongate strip of sheet material, one end of the strip having a first flange extending substantially perpendicular to the elongate strip, and having attachment means therein for connection to the back of an electrical box, and a second flange at the other end of the strip, substantially parallel to the first flange, extending freom the other side of the strip to rest on the inside surface of a wall board, and at least one scored bend line across the strip such that a portion of the strip may be bent in the same direction as the second flange, and substantially parallel thereto to accommodate a different depth of electrical box and a different depth of wall structure.

15 Claims, 2 Drawing Sheets

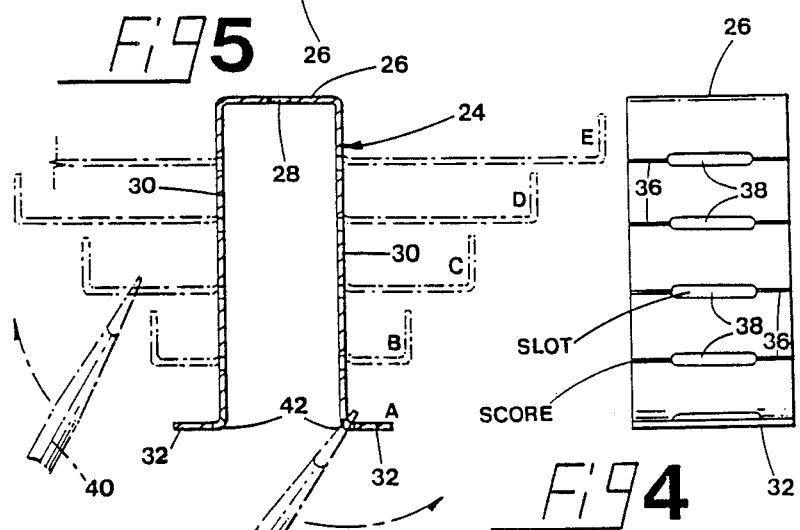

UNIVERSAL SUPPORT BRACKET FOR ATTACHMENT TO THE BACK OF AN ELECTRICAL BOX

The present invention relates to a universal support bracket for attachment to the back of an electrical box to support the electrical box in a hollow wall structure. More specifically the present invention provides a bracket that can be adapted to hold different depths of electrical boxes within hollow wall structures of different depths. The type of boxes supported are preferably equipped with mounting ears or location stops.

Most interior wall structures are hollow and consist of a stud skeleton with wall board coverings. The studs in noncombustible wall structures are made of thin flexible sheet metal and the rigidity of the walls is achieved by attaching stiff wall boards to both sides of the studs.

Electrical boxes for outlet switches and the like are fitted within the wall structure with the open edge of the box either flush with the outside of the wall board, or positioned with the open edge recessed and flush with the inside surface of the wall board. In most cases, the electrical boxes are attached at one side to a stud. However this does not provide a rigid mounting therefore it is necessary to provide additional support to rigidly support the box so that pushing an electrical plug into an outlet, or pulling a plug from an outlet does not move the electrical box within the wall structure. Additional supports in the past have been provided to ensure the rigidity of the box within the wall structure The supports are generally made from wood or steel and fabricated in the field. Whereas this offers good support, it is relatively expensive and time consuming for an electrician to prepare and install such a support on a job site.

Universal support brackets may be provided to attach at the side of the box opposite from the stud attachment. Examples of such brackets are disclosed in co-pending Canadian patent applications serial No. 523,966 and 523,967 filed in the name of William Nattel. These brackets all provide a stop to prevent the boxes being pulled out of the wall and in some instances provide tabs to prevent the box being pushed into the hollow space within the wall area. The tabs however, which are bent to suit a particular size of box do not always provide a positive attachment, and sometimes during installation the tabs may not have been bent to the correct position which can permit them to side off the back side of the box. If this occurs, then the brackets do not provide a positive attachment for holding the sides of the box. A number of boxes provided today have mounting ears or location stops which are mounted on the ends of the box and rest on the inside surface of the wall board adjacent to the cutout for the electrical fitting. These mounting ears or location stops generally are adjustable to suit different thicknesses of wall boards and different positions of the box within the wall structure.

It is an aim of the present invention to provide a universal support bracket that attaches to the back surface of an electrical box and support the box against the inside surface of the far wall board. Thus with the combination of mounting ears or location stops to stop the box being pulled out, and the universal support bracket for stopping the box being pushed in the box is held rigidly within the wall structure. Bend lines are provided in the bracket to take into account different depths of electrical boxes and different depths of wall structures A positive attachment is made between the bracket and the back of the electrical box so that it may be attached to the box prior to installation into the wall structure.

The present invention provides a universal support bracket for attaching varying depths of electrical boxes in hollow wall structures of different depths, the wall structures being formed with a plurality of studs spaced apart with a wall board covering, the bracket comprising an elongate strip of sheet material, one end of the strip having a first flange extending substantially perpendicular to the elongate strip, and having an attachment means therein for connection to the back of an electrical box, and a second flange at the other end of the strip, substantially parallel to the first flange, extending from the other side of the strip to rest on the inside surface of a wall board, and at least one scored bend line across the strip such that a portion of the strip may be bent in the same direction as the second flange, and substantially parallel thereto to accommodate a different depth of electrical box and a different depth of wall structure.

In another embodiment an elongate strip of sheet metal is bent into a U shape with the centre of the U having an aperture for connection to the back of an electrical box and the flanges at the open ends of the arms of the U shape resting on the inside surface of the wall board.

Referring now to the drawings:

FIG. 3 is a side view of a support bracket according to one embodiment of the present invention.

FIG. 4 is a plan view of the bracket shown in FIG. 3.

FIG. 5 is a top view of the bracket shown in FIG. 3.

FIG. 6 is a side view of a bracket bent to fit within a shallow wall structure.

FIG. 7 is a side view showing another embodiment of a support bracket according to the present invention.

Figure 1:
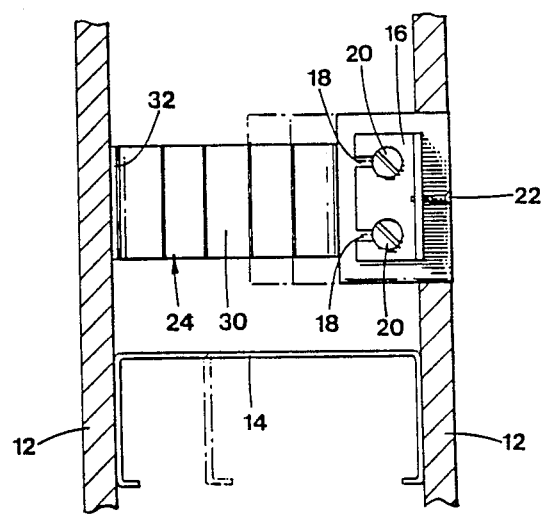
FIG. 1 is a plan view of one embodiment of a support bracket supporting an electrical box within a wall structure.
Figure 2:
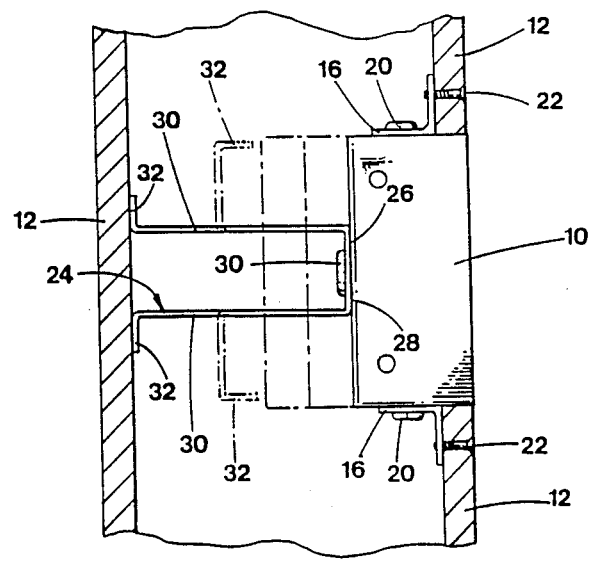
FIG. 2 is a side view of the support bracket within a wall structure as shown in FIG. 1.

FIGS. 1 and 2 illustrate one example of an electrical box 10 in a hollow wall structure with wall boards 12 on each side held apart by a steel stud 14. A shallower stud is illustrated chain dotted in FIG. 1 for a shallower wall structure. The electrical box 10 is not shown attached to the stud 14, however in most cases it is preferred to attach one side of the box 10 to the stud 14. The box 10 has mounting ears 16, sometimes referred to as location stops, which are in the form of an angle at each end of the box 10 and have slots 18 allowing relocation of the ears 16 to take into account different thicknesses of wall board 12 and different locations of the box 10 within the wall structure. The box 10 is shown with the open edge level with the outer surface of the wall board 12. In another embodiment the box 10 may be placed with the open edge level with the inside surface of the wall board 12. Set screws 20 hold the mounting ears 16 to the ends of the box 10, and tapped holes are provided in the ends of the box to allow set screws to hold the mounting ears 16 to the box 10.

If the box 10 is not attached to the stud 14, which is not essential for the support market of the present invention, then a screw 22 may be used to attach the mounting ears 16 to the wall board, as shown on the left hand side of FIG. 2.

The box illustrated in FIG. 1 and 2 may be of three separate sizes, the small size which is shown in solid lines and two deeper boxes shown in chain dotted lines A universal bracket 24 shown in FIG. 1 and 2 has a U shape and the centre or the base 26 has an aperture 28 through which a set screw 30 holds the bracket 24 to the base of the box 10. A tapped hole is provided in the box 10 to ensure that the bracket 24 is firmly held to the box 10.

FIGS. 3, 4 and 5 illustrate a specific bracket 24. The bracket 24 is made of sheet metal and has two arms 30 which extend from a centre or base 26 to form a U shape with flanges extending outward from the end of the arms 30 substantially parallel to the base 26. Whereas the hole 28 in the base 26 is provided for a set screw 30, as illustrated in FIG. 2, the bracket 24 may be mounted to the back of a box 10 during manufacture by spot welding, rivetting, extrusion or coining methods.

FIGS. 3 and 4 show a bracket that can be bent to take into account five different lengths between the back of the box 10 and the inside surface of the wall structure 12. As shown in FIG. 3 position A represents the deepest position of the bracket 24, when the flanges 32 extend out from the ends of the arm 30. Four scored bend lines 36 extend transversely across the arms 30 of the bracket 24. FIG. 3 illustrates in dotted line the portions of the arms 30 bent outwards to provide a shallower bracket to take into account either a shallower electrical box 10 or a shallower depth of wall structure as identified by letter B to E.

FIG. 1 shows three sizes of boxes having a depth of 1 ½ inch, 2 inch and 2 ½ inch which represents the most common sizes of boxes and the two most commonly used studs are 2 ½ inches and 3 ⅝ inches deep. Thus with two variations in stud depth and three variations in box depth, positions A, B, C, D and E represent the different bend portions in the bracket to cope with these variations.

Slots 38 are shown positioned in the center of each bend line 36 to allow a tool, such as a screw driver 40, to be inserted into the slot 38 and bend the bracket at the bend line or score line 36 A further sot 42 is provided in the first part of the flange 32 adjacent the end of the arm 30 to permit the tool 40 to be inserted and thus provide a lever for bending the arm into position B as shown in FIG. 3.

FIG. 6 illustrates the installation of a bracket 24 attached to a box 10 having a depth of 2 ½ inches and installed within a wall structure with studs of 2 ½ inches deep. Assuming the wall board has ½ inch thickness the bracket is bent to position E, as illustrated in FIG. 3, which provides exactly ½ inch between the back surface of the box 10 and the inside surface of the wall board 12.

Another bracket 50 is illustrated in FIG. 7 which is in the form of a Z having a first flange 52 with an aperture 54 therein so the set screw 30 can be attached to the bottom of the box 10. A second flange 56, parallel to the first flange 52, extends from the other end of the bracket 50 in the opposite direction to the first flange 52 and rests flush against the inside surface of the wall board 12. The bracket 50 performs in the same way as the bracket shown in the other drawings. An alternative position is shown in dotted line in FIG. 7 where a bend line permits the bracket to be bent to take into account a different depth of box or alternatively a different depth of wall structure This bracket provides the same features as the U shape bracket but uses less material and provides easier access for the mounting screw as well as to the slots used for the insertion of the screw driver.

Various changes may be made to the embodiments disclosed herein without departing from the scope of the present invention, which is limited only by the following claims.

The embodiments of the invention in which an exclusive property or privilege is claimed are defined as follows:

1. A universal support bracket for attaching varying depths of electrical boxes in hollow wall structures of different depths, the wall structures being formed with a plurality of studs spaced apart with a wall board covering, the bracket comprising:

an elongate strip of sheet material, one end of the strip having a first flange extending substantially perpendicular to the elongate strip, and having an attachment means therein for connection to the back of an electrical box, and a second flange at the other end of the strip, substantially parallel to the first flange, extending from the other side of the strip to rest on the inside surface of a wall board, and at least one scored bend line across the strip such that a portion of the strip may be bent in the same direction as the second flange, and substantially parallel thereto to accommodate a different depth of electrical box and a different depth of wall structure.

2. A universal support bracket for attaching varying depths of electrical boxes, equipped with location means, in hollow wall structures of different depths, the wall structures being formed with a plurality of studs spaced apart with a wall board covering, the bracket comprising:

an elongate strip of sheet metal bent into a U shape form with two arms and a centre portion, the centre portion having an attachment means therein for connection to the back of an electrical box, and flanges at the open ends of the arms of the U shape form extending in opposite directions away from the U shape form, the flanges substantially parallel to the centre of the U shape form to rest on the inside surface of a wall board, and at least one scored bend line at the same height across each arm, such that portions of the arms may be bent in the same direction as the flanges, and substantially parallel to the centre of the U shape form to accommodate a different depth of electrical box and a different depth of wall structure.

3. The universal support bracket according to claim 2 wherein a plurality of scored bend lines are provided on both arms, the position of the bend lines being the same on both arms.

4. The universal support bracket according to claim 2 wherein location means are provided on the ends of the electrical box and comprise adjustably positioned angle stops for positioning the box in the wall structure.

5. The universal support bracket according to claim 1 or claim 2 wherein the attachment means comprises a set screw passing through an attachment aperture and fitted into a tapped hole in the back side of the box to hold the support bracket to the box.

6. The universal support bracket according to claim 1 or claim 2 including a bending aperture in the approximate centre of the bend line for insertion of a too to bend the portion above the bend line.

7. The universal support bracket according to claim 1 including a bending aperture located in the strip where the second flange extends from the other end of the strip for insertion of a tool to bend a portion of the strip above the bend line.

8. The universal support bracket according to claim 2 including bending apertures at the open ends of the arms of the U shape form at the commencement of the flanges for insertion of a tool to bend the portions of the arms above the bend lines.

9. An electrical box mounting arrangement comprising:

an electrical box in a hollow wall structure with two wall boards held apart by a stud, the box having mounting ears for locating the box with an open front edge even with a surface of one of the wall boards and a bottom of the box spaced a distance from an inner surface of the second wall board;

a bottom support bracket for providing support of the box in relation to the second wall board and comprising a unitary sheet member having a first portion extending substantially perpendicular to, and across the distance between, the box bottom and the second wall board, a second portion at an end of the first portion formed to fit flat against the box bottom, and a third portion at an opposite end of the first portion formed to fit flat against the wall board.

10. An electrical box mounting arrangement in accordance with claim 9 wherein:

the bottom support bracket consists essentially only of the first, second and third portions and the second portion is attached to the box bottom.

11. An electrical box mounting arrangement in accordance with claim 9 wherein:

the bottom support bracket further comprises a fourth portion and a fifth portion of the same unitary sheet member which are formed to be extended from the second portion, at the box bottom, in the same manner as the first and third portions, respectively, and the second portion is attached to the box bottom.

12. An electrical box mounting arrangement in accordance with claim 9 wherein:

the box has no attachment to the stud.

13. An electrical box mounting arrangement in accordance with claim 12 wherein:

the box is secured to the one wall board by fasteners to the mounting ears.

14. An electrical box mounting arrangement in accordance with claim 9 wherein:

the unitary sheet member has at least one bend line for forming the extend of the first portion to match a particular distance between the box bottom and the second wall board that is less than the maximum distance which the member accommodates.

15. An electrical box mounting arrangement in accordance with claim 14 wherein:

each bend line is a scored line in the sheet member with a slot at a portion thereof to allow insertion of a tool for bending.

* * * * *